(12) United States Patent
Araki et al.

(10) Patent No.: US 7,374,831 B2
(45) Date of Patent: May 20, 2008

(54) MAGNETIC RECORDING MEDIUM

(75) Inventors: Ryoko Araki, Tokyo (JP); Yoshio Takahashi, Tokyo (JP)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 453 days.

(21) Appl. No.: 10/976,649

(22) Filed: Oct. 29, 2004

(65) Prior Publication Data
US 2005/0142387 A1 Jun. 30, 2005

(30) Foreign Application Priority Data
Dec. 25, 2003 (JP) ............................. 2003-430081

(51) Int. Cl.
*G11B 5/66* (2006.01)
(52) U.S. Cl. ...................................... 428/832
(58) Field of Classification Search ................ 428/832, 428/831.2
See application file for complete search history.

(56) References Cited

U.S. PATENT DOCUMENTS 6,699,600 B2 * 3/2004 Shimizu et al. ............. 428/828
7,147,942 B2 * 12/2006 Uwazumi et al. ......... 428/831.2
2003/0049498 A1 * 3/2003 Shimosato ............ 428/694 TS

FOREIGN PATENT DOCUMENTS

| JP | 2001-283428 A | 10/2001 |
| JP | 2002-358615 A | 12/2002 |
| JP | 2003-115106 A | 4/2003 |
| JP | 2003-178413 A | 6/2003 |

* cited by examiner

*Primary Examiner*—Holly Rickman
(74) *Attorney, Agent, or Firm*—Townsend and Townsend and Crew LLP; Darren Gold

(57) ABSTRACT

A distribution of grain boundaries in a magnetic recording medium having a granular structure is reduced so that the magnetic recording medium with a high medium signal-to-noise ratio is provided. According to one embodiment, in an underlayer composed of grains each having a generally columnar structure and in a magnetic recording layer composed of magnetic crystal grains each having a generally columnar structure and grain boundaries, a grain size Dm of the magnetic recording layer and a grain size Du of each of the underlayer crystal grains are determined to satisfy a relationship represented by $0.8 \times Du \leq Dm < Du$ and a standardized grain boundary distribution obtained by dividing the standardized deviation of the distribution of the grain boundaries by an average grain boundary width is adjusted to about 0.4 or less.

14 Claims, 4 Drawing Sheets

MAGNETIC RECORDING MEDIUM

CROSS-REFERENCES TO RELATED APPLICATIONS

This application claims priority from Japanese Patent Application No. 2003-430081, filed Dec. 25, 2003, the entire disclosure of which is incorporated herein by reference.

BACKGROUND OF THE INVENTION

The present invention relates to a magnetic recording medium and, more particularly, to a magnetic recording medium having a magnetic recording layer composed of magnetic crystal grains each having a column structure and grain boundaries.

As a main-stream recording system used in a hard disk drive, a longitudinal magnetic recording system which performs recording by orienting magnetization in a longitudinal direction of a substrate is used at present. However, a perpendicular magnetic recording system which orients magnetization in a direction perpendicular to a substrate has been studied vigorously to achieve a higher recording density, i.e., implement a larger-capacity hard disk drive. A recording medium used for perpendicular magnetic recording has an easy axis of magnetization in a direction generally perpendicular to a substrate and is composed of a magnetic recording layer for holding a record, a soft magnetic underlayer for the efficient use of a magnetic field from a magnetic head, and the like. In the perpendicular recording system, magnetic stabilization is achieved since magnetization is in an anti-parallel direction in a boundary portion (magnetization transition domain) between recorded magnetization domains (recording bits) and the width of a so-called zigzag domain wall is reduced so that medium noise is reduced. The soft magnetic underlayer not only serves as a return path for the magnetic field from the magnetic head but also can generate an intense magnetic field in the magnetic recording layer portion due to a mirror image effect when used in combination with a single pole head. This allows the use of a recording magnetic film with a high coercivity, also achieves a reduction in the width of the zigzag domain wall, and contributes to a reduction in medium noise.

As a condition on an extremely fine structure of a medium for a reduction in medium noise, it is requested that the grain size of each of magnetic crystal grains is extremely small and an exchange interaction between the adjacent crystal grains is small. The reason is that, since a unit of magnetic transition is one crystal grain composing the magnetic recording layer or a plurality of the crystal grains coupled to each other, the width of the magnetization transition domain is greatly dependent on the magnitude of the unit of magnetic transition. To greatly reduce the crystal grain size of the recording layer used in a perpendicular magnetic recording medium and reduce medium noise, in particular, there has been proposed a technology as shown in Japanese Unexamined Patent Publication No. 2003-115106, which changes an underlayer immediately under the recording layer into an amorphous alloy of Ti or Zr. Japanese Unexamined Patent Publication No. 2001-283428 discloses a technology which causes an element having a body-centered cubic lattice structure, such as Cr or V, to be solid-solved in Ru of the underlayer immediately underlying the recording layer and thereby greatly reduces the grain size. On the other hand, a magnetic recording medium having a so-called granular structure has been proposed in which the peripheral portions (crystal grain boundaries) around the magnetic crystal grains are surrounded by a non-magnetic layer for a reduction in the interaction between the crystal grains. For example, Japanese Unexamined Patent Publication No. 2002-358615 discloses a magnetic recording medium having a granular structure in which an average spaced distance between grains is adjusted to 1.0 nm or more. As a grain boundary layer to be used, an oxide, a nitride, a fluoride, a carbide, or the like is listed as examples. In addition, Japanese Unexamined Patent Publication No. 2003-178413 discloses a magnetic recording medium having a granular structure which uses an oxide for a non-magnetic layer composing a grain boundary layer, defines the volume of an oxide contained in a magnetic recording layer, and thereby implements a high coercivity. In the case of using a CoCrPt-based alloy in a longitudinal recording system, a non-magnetic element such as Cr is locally precipitated at the grain boundary portions so that the inter-grain interaction is reduced relatively excellently. If a CoCrPt-based alloy is used in a perpendicular recording medium, however, local precipitation of Cr at the grain boundaries is less likely to occur so that it has been difficult to form a satisfactory grain boundary.

BRIEF SUMMARY OF THE INVENTION

In such a granular perpendicular medium, it still remains necessary to greatly reduce the grain sizes of the magnetic crystal grains and reduce the magnitude of the inter-grain interaction for a reduction in medium noise and an increase in medium signal-to-noise ratio. The grain size of the magnetic recording layer in a granular perpendicular medium varies depending on the temperature of a substrate, the pressure of a sputter gas during the formation of magnetic crystal grains, an amount of oxygen contained in the sputter gas, the volume of a non-magnetic layer forming grain boundaries, and the like. To obtain a desired crystal grain size, therefore, not just one of the foregoing formation conditions but plural ones thereof are to be controlled properly. The crystal grain size can be measured with high accuracy from observation using a transmission electron microscope and changes resulting from various formation conditions can easily be known. For example, rapid scaling down of a crystal grain size can be recognized if the amount of oxygen contained in the sputter gas is increased.

As a result of a detailed examination made by the present inventors, it was elucidated that, when the crystal grain size was reduced greatly, the medium signal-to-noise ratio was reduced to a value smaller than expected from the crystal grain size, though a large change did not occur in magnetostatics property. It may be considered that, when the interactions between the crystal grains of magnetic recording layers and the magnetostatics properties thereof are equal, the medium signal-to-noise ratios change depending on the grain sizes. The reason for the improvement in medium signal-to-noise ratio which is not sufficient may be a change in inter-grain interaction, because the magnetostatics properties are nearly equal. Since the inter-grain interaction is dependent on the distance (grain boundary width) between magnetic crystal grains, it was estimated that the present result was attributable to the grain boundary width. As a result of measuring grain boundary widths by using a transmission electron microscope, it was elucidated that the grain boundary widths had a wide distribution, portions formed with grain boundaries of 1 nm or more and portions formed with narrow and small grain boundaries of 0.5 nm were present in mixed relation, and portions in which the inter-grain interaction had not been reduced satisfactorily were formed. A magnetic recording medium having such an extremely fine structure cannot have a high signal-to-noise ratio since a reduction in the inter-grain interaction is not sufficient, though the grain sizes have been reduced greatly.

It is therefore a feature of the present invention to provide a perpendicular magnetic recording medium having a granular structure in which the width of a grain boundary layer has been controlled and further provide a perpendicular magnetic recording medium having a high medium signal-to-noise ratio.

The foregoing feature is attained by forming a magnetic recording medium having a granular structure in which the sizes of magnetic crystal grains and the sizes of crystal grains in an underlayer are controlled properly and the distribution of grain boundary widths is controlled to be substantially uniform. A description will be given herein below to ways for solving the problem based on the findings made by the present inventors.

In a magnetic recording medium in a longitudinal recording system used conventionally or a perpendicular magnetic recording medium not having a granular structure, an underlayer having a column structure is formed prior to the formation of magnetic crystal grains and a magnetic recording layer is formed to come in contact therewith, such that the crystal orientation and grain sizes of the magnetic crystal grains are controlled. The underlayer is composed of extremely small crystal grains each having a column structure which are preferentially oriented in the (100) plane of a Cr alloy in the case of longitudinal recording and magnetic crystal grains are formed thereon by generally epitaxial growth to be oriented in the (110) direction. The grain sizes of the magnetic crystal grains become nearly equal to the grain sizes of the underlayer crystal grains. In the case of a perpendicular recording medium using a CoCrPt-based alloy magnetic layer not having a granular structure, a layer in which Ti alloy columnar grains or the like are oriented in the (001) direction is used as the underlayer and magnetic crystal grains are epitaxially grown immediately thereover to be oriented in the (001) direction under a control operation. In this case also, the crystal grain sizes of the magnetic crystal grains become nearly equal to the crystal grain sizes of the underlayer crystal grains. The same control operation will be performed even in a perpendicular magnetic recording medium having an artificial lattice structure in which Co and Pd are alternately stacked in layers.

Figure 1:
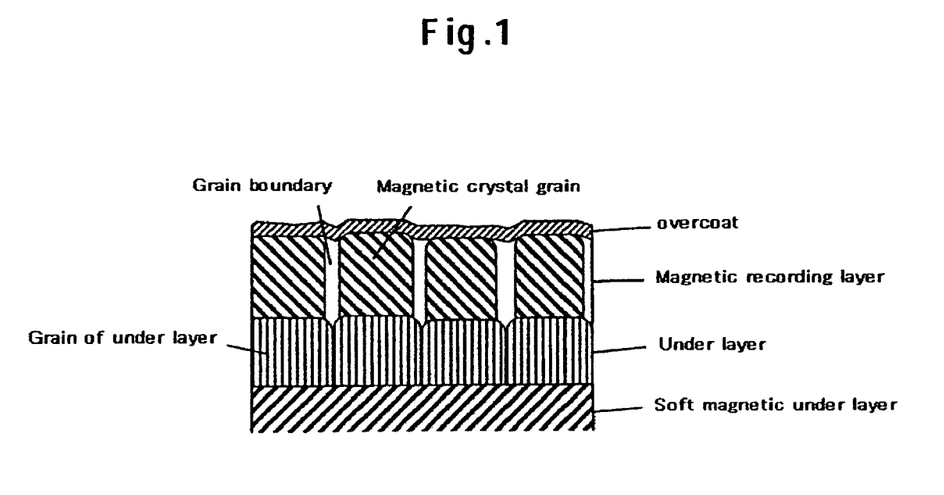
FIG. 1 is a cross-sectional image showing a relationship between the crystal grains and grain boundaries of a magnetic recording layer with a low standardized distribution value and the crystal grains of an underlayer.
Figure 2:
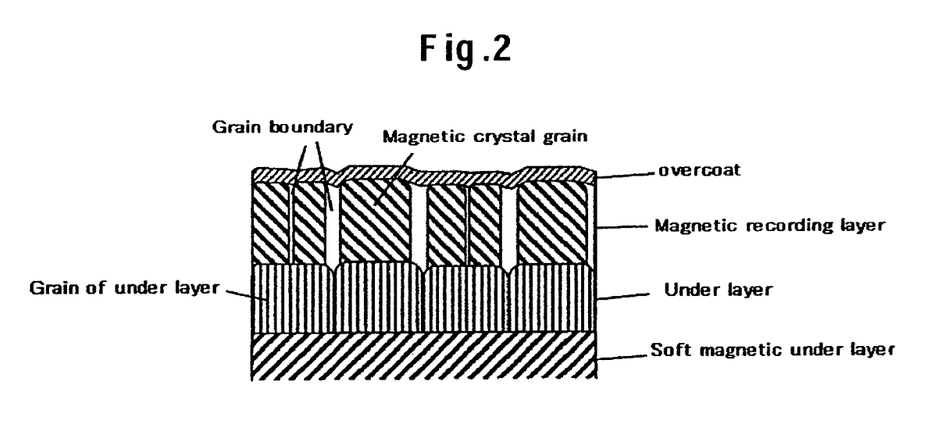
FIG. 2 is a cross-sectional image showing a relationship between the crystal grains and grain boundaries of a magnetic recording layer with a high standardized distribution value and the crystal grains of an underlayer.

A description will be given next to a relationship between underlayer crystal grains and magnetic crystal grains in a granular medium with reference to FIGS. 1 and 2. The granular structure is a structure in which extremely fine magnetic grains are dispersed in a matrix of a non-magnetic material such as an oxide, a nitride, a fluoride, or a carbide. In the case of a perpendicular magnetic recording medium having this granular structure in which a non-magnetic material is formed in grain boundaries, underlayer crystal grains each having a column structure and magnetic crystal grains each having a column structure are epitaxially grown in contact with each other and the crystal orientation of the magnetic crystal grains is controlled in the same manner by the crystal orientation of the underlayer crystal grains (FIG. 1).

However, the present inventors have found that, because a grain boundary layer is formed not only in the grain boundaries between magnetic crystal grains located along the grain boundaries between the underlayer crystal grains but also in the portions corresponding to the insides of the underlayer crystal grains, the grain sizes of the magnetic crystal grains are not controlled by the sizes of the underlayer grains and the grain size of the underlayer and that of the magnetic recording layer are not necessarily coincident. The present inventors have also found that the grain boundary widths between the grains in the magnetic recording layer are relatively large in the portions located along the grain boundaries between the underlayer crystal grains but the grain boundaries formed in the portions corresponding to the insides of the underlayer crystal grains are formed to have extremely small widths. If the grain boundary between the magnetic crystal grains located along the boundary between the underlayer crystal grains is about 1 nm in width, the grain boundary between the magnetic crystal grains not located along the grain boundary between the underlayer crystal grains is 0.5 nm or less in width and extremely narrow, which is a distance insufficient to reduce the inter-grain interaction. Conversely, if the magnetic recording layer is formed under such conditions that the grain boundary width between the magnetic crystal grains not located along the grain boundary between the underlayer crystal grains becomes 1 nm or more, the grain boundary between the magnetic crystal grains located along the grain boundary between the underlayer crystal grains becomes excessively wide, which causes the problem that the volume of the portions of the magnetic crystal grains decreases and the magnitude of saturation magnetization in the magnetic recording layer becomes excessively small or the like. In short, it was elucidated that the formation of a granular medium having an extremely fine structure in which the grain boundaries between the magnetic crystal grains have substantially uniform widths is necessary, as well as a great reduction in the sizes of the magnetic crystal grains.

As an indicator of the uniformity of the grain boundary widths, a value obtained by dividing the standardized deviation of the distribution of the grain boundary widths by the average value of the grain boundary widths (standardized grain boundary distribution) is used. According the result of the examination made by the present inventors, a standardized grain boundary width when the medium signal-to-noise ratio is smaller than a medium signal-to-noise ratio estimated from the grain sizes is 0.5 or more and the standardized grain boundary width in a medium in which grain boundaries are formed to have uniform widths is 0.4 or less. This indicates that the medium according to one embodiment of the present invention is wherein the standardized grain boundary width becomes less than about 0.5 and, more preferably, about 0.4 or less.

To form a granular structure having such uniform grain boundary widths, it is sufficient to form the underlayer crystal grains and the magnetic crystal grains such that they have substantially equal grain sizes and that the grain boundary portions between the underlayer crystal grains and those between the magnetic crystal grains coincide with each other. As a result, each of the grain boundaries between the magnetic crystal grains is allowed to have a sufficient width. As described above, it is to be noted that, in the case of a perpendicular magnetic recording medium having a granular structure, the grains in the underlayer and the grains in the magnetic recording layer do not have equal grain sizes even when they have been generally epitaxially grown. If the grain sizes of the magnetic crystal grains are larger than those of the underlayer crystal grains, portions which are insufficient in the crystal matching property with the underlayer crystal grains are formed inside the magnetic crystal grains so that a crystal defect, a strong strain, or the like occurs in a magnetic crystal, which unfavorably induces a significant reduction in magnetic property. If the grain sizes of the magnetic crystal grains become excessively smaller than those of the underlayer crystal grains, narrow grain boundaries are formed unfavorably in the portions corresponding to the insides of the underlayer crystal grains, as stated previously. As a result of the detailed examination made by the present inventors using a transmission electron microscope, it was elucidated that the narrow grain boundaries started to be formed when the sizes of the magnetic crystal grains become about 80% or less of the sizes of the underlayer crystal grains. Thus, the medium according to one embodiment of the present invention is wherein the crystal grain size Dm of the magnetic recording layer and the crystal grain size Du of the underlayer satisfy a relationship represented by 0.8×Du<Dm<Du.

In a magnetic recording medium according to an embodiment of the present invention, the grain size of the underlayer and the grain size of the magnetic recording layer have been controlled to have a proper relation therebetween so that the formation of narrow grain boundaries is suppressed. As a result, a magnetic recording medium in which the exchange coupling between magnetic crystal grains is small can be provided. This allows a reduction in medium noise and provides a magnetic recording medium with a high Signal-to-noise ratio.

DETAILED DESCRIPTION OF THE INVENTION

Referring to the drawings, the embodiments of the present invention will be described herein below.

Figure 3:
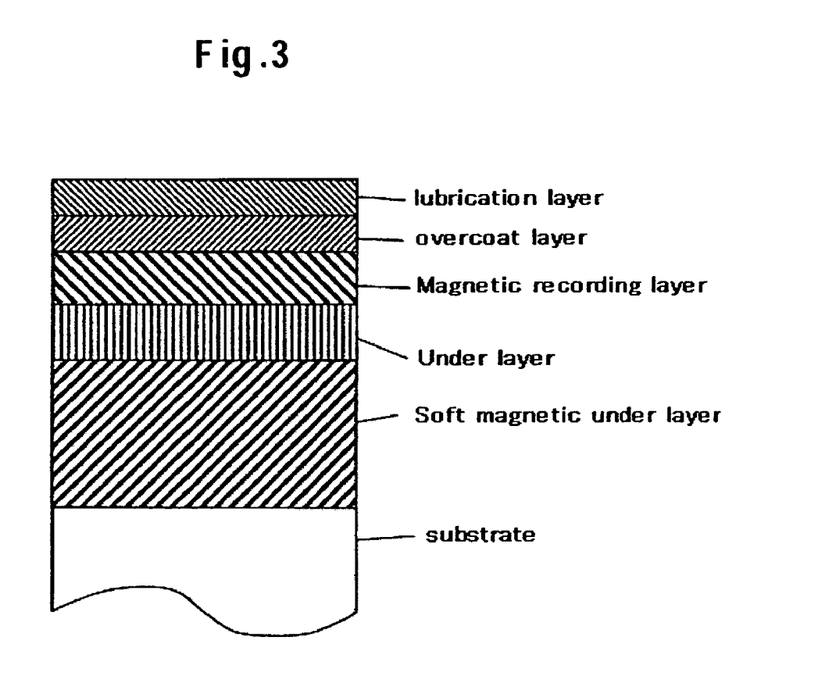
FIG. 3 is a view showing a structure of layers in a magnetic recording medium.

FIG. 3 shows a structure of a magnetic recording medium according to an embodiment of the present invention. A disk-shaped substrate is formed with a soft magnetic underlayer, a non-magnetic underlayer, a magnetic recording layer having perpendicular magnetic anisotropy, an overcoat layer, and a lubricant layer. These layers can be formed on the both sides of the disk-shaped substrate. Of the individual layers described above, the soft magnetic underlayer, the non-magnetic underlayer, and the magnetic recording layer can be formed by using, e.g., a magnetron sputtering machine. The overcoat layer can be formed by an ion beam process or the like. The lubricant layer can be formed by a dipping method or the like. The individual layers may also be formed by other means including vacuum vapor deposition, ECR sputtering method, CVD method, spin coat method, and similar processes.

As the substrate, an Al substrate plated with NiP, a glass substrate having a chemically reinforced surface, a crystallized glass substrate, or the like can be used. Moreover, a non-magnetic substrate excellent in surface planarity and formed of a material which would not be magnetized or deformed by heating at about 300° C. can be used in the same manner. The surface of the substrate may be polished to have projections and depressions with an average roughness of about 3 nm or less or formed with extremely fine grooves termed a texture in a circumferential direction of the disk. The texture has an average roughness of about 3 nm or less and the average spacing between the grooves measured in a radial direction of the disk is preferably about 50 nm or less and, more preferably, about 20 nm or less. If the average roughness of the surface of the substrate exceeds about 3 nm, the projections and depressions in the outermost surface of the magnetic recording medium become large so that the floating level of the magnetic head is raised inevitably, which is not preferable because a head magnetic field cannot efficiently be applied to the magnetic recording layer.

For the soft magnetic underlayer, a material exhibiting a soft magnetic property with a low coercivity is used. For example, an alloy such as CoTaZr, FeTaC, FeAlSi, CoFeB, or NiFe can be used. Furthermore, a material exhibiting a soft magnetic property and a saturated magnetic flux density of about 1 T or more can be used in the same manner. Since the soft magnetic underlayer has the direction of its magnetization made coincident with the radial direction of the disk, a magnetic domain controlled layer may also be provided in combination. The direction of magnetization of the soft magnetic underlayer can be fixed by, e.g., inserting an antiferromagnetic material such as FeMn, IrMn, MnPt, or CrMnPt into the lower, middle, and upper portions of the soft magnetic underlayer and the like, heating the soft magnetic underlayer, and then cooling it with a magnetic field in the radial direction of the disk being applied. The direction of magnetization can also be fixed by dividing the soft magnetic underlayer into a multilayer structure by using a non-magnetic layer of about 1 nm and thereby causing antiferromagnetic coupling between the individual layers. Since the soft magnetic underlayer is used mainly as a return path for a head magnetic flux, it is sufficient for the soft magnetic underlayer to have a thickness which allows the passage of the head magnetic flux therethrough without causing magnetic saturation. In the case of using, e.g., a CoTaZr soft magnetic underlayer, it can show sufficient performance with a thickness of about 300 nm. In addition, a non-magnetic layer can be inserted between the soft magnetic underlayer and the substrate to enhance the adhesion between the soft magnetic underlayer and the substrate or suppress a chemical reaction between the substrate and the soft magnetic underlayer or the diffusion of an element. For example, Cr, NiTa, NiTaZr, CrTi, CrTiTa, TiAl, or the like can be used. Likewise, other non-magnetic layers can also be used provided that they attain the foregoing object.

The underlayer is composed of a non-magnetic material composed of crystal grains having a generally columnar structure. Since the underlayer is used to control the crystal orientation of the magnetic recording layer formed thereover, it preferably has an hcp structure and the preferential orientation direction thereof is [001]. A material used therefore is Ru, an alloy thereof, CoCr, an alloy thereof, Ti, an alloy thereof, or the like. An element to be added to form an alloy is Ru, Cr, B, V, Zr, Mo, W, or the like. By forming an alloy, it becomes possible to change a lattice constant and enhance lattice matching with the magnetic recording layer formed over the underlayer. The underlayer may also be composed of a plurality of layers. For example, an oxide layer made of MgO or the like or a metal layer made of Ta or the like is formed to a thickness of about 1 nm as a first layer. Then, an island shaped film made of Pd or the like, which serves as a core for growth, is formed to determine the crystal grain size of the underlayer and at least one layer made of Ru or the like is formed thereafter. As a result, growth proceeds by using the formed island shaped film as a core and allows the formation of a multiple crystal layer having the hcp structure oriented in the [001] direction. Preferably, an average crystal grain size is 5 nm to 12 nm. This is to implement a grain size equal to the crystal grain size needed by magnetic crystal grains formed over the underlayer. The crystal grain size can be controlled by controlling a substrate temperature, the pressure of a sputter gas, a film formation rate, or a film thickness during the formation of the underlayer or further controlling the density of island shaped cores. The total thickness of the underlayer is preferably adjusted to about 2 to 20 nm. If the underlayer is thinner than about 2 nm, the crystallinity and crystal orientation property of Ru or the like become insufficient so that the crystal orientation property of the magnetic recording layer is degraded. If the underlayer is thicker than about 20 nm, the distance from the magnetic head to the soft magnetic underlayer becomes excessively large so that an overwrite capability lowers because an intense magnetic field cannot be applied by the magnetic head to the magnetic recording layer or the thermal stability of recording magnetization lowers because the coercivity of the medium cannot be increased.

The magnetic recording layer has a granular structure in which magnetic crystal grains each having a generally columnar structure and grain boundaries between the crystal grains are filled with a non-magnetic layer. For the magnetic crystal grains, a CoCrPt alloy having a hcp structure which is doped with at least one of B, Ta, Cu, Ru, Ti, Si, and the like is used. The magnetic crystal grains have a generally epitaxial relationship with underlayer crystal grains and the preferential orientation direction thereof is [001]. Preferably, the average crystal grain size of the magnetic crystal grains is not less than about 5 nm and not more than about 12 nm. This is because, if the average crystal grain size is smaller than about 5 nm, thermal stability lowers and the attenuation of recording magnetization becomes marked. Conversely, if the average crystal grain size exceeds about 12 nm, medium noise unfavorably increases prominently. The crystal grain size is controlled to be more than about 0.8 times and less than about 1 times the crystal grain size of the underlayer. Formation is performed by controlling, e.g., the pressure of an Ar sputter gas in a magnetron sputtering film deposition system, an amount of oxygen contained in the Ar gas, a charged power, and the like. The non-magnetic grain boundaries can be formed by depositing a film through the sputtering of an oxide of Si, Al, Ti, Mg, or the like simultaneously with a CoCrPt alloy or the like. It is also possible to use a nitride of Si, T, B, or the like. The formation of a magnetic recording layer having a granular structure composed of, e.g., a CoCrPt alloy and an Si oxide can be performed by alternately sputtering a sputter target of the CoCrPt alloy and a sputter target of the Si oxide, while rotating the sputter targets, and thereby depositing a film. The film deposition may also be performed simultaneously by using a sputter target obtained by mixing the CoCrPt alloy and the Si oxide. The volume ratio of the Si oxide contained in the magnetic recording layer is preferably not less than about 10% and not more than about 30%. This is because, if the volume ratio of the Si oxide is not more than about 10%, sufficiently wide grain boundaries cannot be formed so that the medium noise lowers and, if the volume ratio is not less than about 30%, the coercivity lowers. Preferably, the coercivity of the magnetic recording layer measured in a direction perpendicular to the substrate is about 300 kA/m or more. This is because, if the coercivity is not more than about 300 kA/m, the attenuation of recording magnetization with time becomes marked. Preferably, the film thickness of the magnetic recording layer is adjusted to 5 nm to 30 nm. This is because, if the magnetic recording layer is thinner than about 5 nm, the lowering of the coercivity and the degradation of thermal stability become marked and, if the magnetic recording layer is thicker than about 30 nm, the distance between the magnetic head and the soft magnetic underlayer is increased and the gradient of the head magnetic field is reduced. This reduces a recording resolution and the intensity of the head magnetic field and thereby causes the degradation of the overwrite capability.

For the overcoat layer, a film containing C as a main component can be used. It will easily be appreciated that other films can also be used in the same manner provided that they can protect the magnetic recording layer from corrosion or the like. Preferably, the film thickness of the overcoat layer is not less than about 1 nm and not more than about 5 nm. This is because, if the film thickness of the overcoat layer is not more than about 1 nm, it is insufficient to protect the magnetic recording layer when the head collides with the surface of the medium and, if the film thickness is not less than about 5 nm, the distance between the magnetic head and the medium is extended to cause the lowering of the recording resolution. For the lubricant layer, a perfluoroalkylpolyether-based material or the like can be used.

A description will be given next to a method for measuring the crystal grain size of the magnetic recording layer. The measurement of the crystal grain size is performed by observing a crystal grain image by using a transmission electron microscope and analyzing the image. First, a sample of the magnetic recording medium, which is a small piece of about 2 mm square, is cut out of the disk. The small piece is polished to form an extremely thin film partially composed only of the magnetic recording layer and the overcoat layer. The thin-film sample is observed from a direction perpendicular to the substrate surface by using the transmission electron microscope and a crystal grain image in a bright field is shot. A bright-field image is an image formed by cutting off a diffracted electron beam by using the objective aperture of the electron microscope and using only an undiffracted electron beam. In the bright-field image of a granular medium, the portions of crystal grains which are high in diffraction intensity appear as dark contrast portions, while the portions of grain boundaries which are low in diffraction intensity appear as bright contrast portions, so that an image in which the crystal grains and the grain boundaries are distinctly separated from each other is obtainable. In the bright-field image, lines are drawn along the boundary portions between the crystal grains in dark contrast so that a crystal grain image is obtained. In each of FIGS. 4 and 5, an example of the crystal grain image obtained from the bright-field image obtained from a transmission electron microscopic image is shown. Then, the obtained crystal grain image is captured by using a scanner and loaded into a personal computer to provide digital data. The loaded image data is analyzed by using commercially available grain analysis software, determining the number of pixels composing each of the grains, and further determining the area of each of the grains by converting the number of pixels to a value on an actual scale. The grain size is defined as the diameter of a circle having an area equal to the predetermined area of the grain. The measurement is performed for 300 or more grains and the average grain size is defined as an arithmetic average of the obtained grain sizes.

A description will be given next to a method for measuring the crystal grain size of the underlayer. First, a sample of the magnetic recording medium, which is a small piece of about 2 mm square, is cut out of the disk. The small piece is polished to form an extremely thin film partially composed only of the magnetic recording layer and the overcoat layer. The thin-film sample is observed from a direction perpendicular to the substrate surface by using a transmission electron microscope and a crystal lattice image is shot. The crystal lattice image shot herein is an image obtained from the interference of a diffracted electron beam with an undiffracted electron beam under electron microscopic observation, in which a fringe pattern corresponding to crystal lattice planes is observed in the crystal grains. The direction and spacing of this fringe pattern coincide with the direction and spacing of a crystal plane in a direction perpendicular to the substrate. Since the underlayer and the magnetic recording layer have been grown generally epitaxially, the portions of the obtained lattice image which are adjacent to each other and have a direction and a spacing coincident with those of crystal lattice fringes indicate portions in which the crystal directions of the underlayer crystal grains are constant and reflect the configurations of the underlayer crystal grains. Hence, it can be considered that one underlayer crystal grain is present on a one-by-one basis in the portions adjacent to each other and having lattice fringes equal in spacing and direction. By assuming that the boundary between the underlayer grains is at the center of the grain boundary portion between the magnetic crystal grains and drawing a line along the grain boundary portion, an image of the grain boundary between the underlayer crystal grains can be obtained. The image of the boundary between the underlayer crystal grains thus obtained is loaded into a personal computer and changed into digital data by representing the area of each of the grains in the number of pixels. The area of each of the grains is determined by converting the number of pixels to a value on an actual scale and the grain size is defined as the diameter of a circle having an area equal to this area. An average underlayer grain size is further defined by calculating an arithmetic average of 300 or more grains.

It was also proved from the following fact that the present approach represents the correct boundary between the underlayer grains. First, the underlayer crystal grain size was measured by using a sample on which the layers had been formed under exactly the same conditions as the foregoing evaluated medium till the formation of the underlayer, which coincided with the underlayer grain size measured in accordance with the foregoing approach. As an extremely thin film sample for transmission electron microscopic observation, a sample having a portion composed only of an underlayer, a magnetic recording layer, and an overcoat layer was produced and observed. As a result, moire images with equal periods were observed on a one-by-one basis for the individual grains and it was proved that the respective crystal orientations of the underlayer and the magnetic recording layer retain a given relationship therebetween. It was also proved that the portion at which the direction of the moire fringe changed was the boundary portion between magnetic crystal grains and that the boundaries between the underlayer grains coincided with some of the grain boundaries between the magnetic-layer grains. That is, it was proved that the underlayer crystal grain size could be determined correctly by using the approach which judges, from the lattice image of the magnetic crystal grains, that the portions in which the directions of lattice fringes are equal are the portions of the underlayer grains.

A description will be given next to a method for measuring grain boundary widths in the magnetic recording layer. In the crystal grain image of FIG. 4, the position of the center of gravity of each of the grains is determined by using commercially available grain analysis software. Lines are drawn between the respective centers of gravity of the adjacent grains and the lengths thereof located in the grain boundary portions are determined in the numbers of pixels. The lengths of the grain boundary portions are calculated by converting the determined lengths of the grain boundary portions to values on an actual scale and an average grain boundary width is defined by arithmetically averaging the lengths of the 300 or more grain boundaries. By dividing the standardized deviation of the values of the obtained grain boundary widths by the average grain boundary width, the standardized grain boundary distribution is defined. Here, the adjacent grains are grains with no other grain present on the line drawn between the respective centers of gravity thereof. There are a plurality of grains adjacent to one grain.

Aspects of the present invention will be described herein below based on experimental examples.

EXPERIMENTAL EXAMPLE 1

In a first magnetic recording medium according to Experimental Example 1, an NiTa37.5Zr10 film was formed first on a chemically reinforced glass substrate through alkaline cleaning to a thickness to 30 nm. Here, the number 37.5 after Ta and the number 10 after Zr in NiTa37.5Zr10 represent the respective concentrations of Ta and Zr contained in the film in atomic percentage. In short, NiTa37.5Zr10 is an abbreviated representation of 52.5 at.% Ni-37.5at.% Ta-10at.% Zr. By contrast, a representation with no numeric value such as NiTaZr is an abbreviated representation of the same composition ratio as that of a film containing the same elements and shown immediately before. Similar abbreviated representations will be used herein below. Then, a FeCo30B15 film was formed to a thickness to 300 nm and a Ta film was formed to a thickness of 1 nm. Thereafter, an Ru film was formed under the condition that the pressure of an Ar gas was 2.0 Pa by a DC magnetron sputtering process. At this time, the substrate temperature was a room temperature and the film thickness was adjusted to 20 nm. Then, a magnetic recording layer was formed such that the volume ratio between CoCr17Pt14 and $SiO_2$ became 80:20. Film deposition was performed by sputtering CoCrPt through a DC magnetron sputtering process and sputtering $SiO_2$ through an RF magnetron sputtering process under the condition that the pressure of an Ar gas was 2.0 Pa and a film thickness was adjusted to 18 nm. Sputtering targets of CoCrPt and Ru were mounted on a rotating holder so that sputtering was performed when the targets came to a position over the disk substrate. The substrate temperature was adjusted to a room temperature. Thereafter, C was deposited to a thickness of 5 nm as an overcoat film.

Next, for comparison, a recording medium was formed as a second magnetic recording medium under exactly the same conditions as the first magnetic recording medium till the Ru film was deposited. Then, the medium was produced by depositing a film under the condition that the pressure of an Ar gas was 4.0 Pa such that the volume ratio between CoCrPt and $SiO_2$ became 80:20. The substrate temperature was a room temperature and the film thickness was adjusted to 18 nm. Thereafter, C was deposited to a thickness of 5 nm as an overcoat film.

Next, for comparison, a recording medium was formed as a third magnetic recording medium under exactly the same conditions as the first magnetic recording medium till the Ru film was deposited. Then, the medium was produced by depositing a film under the condition that the pressure of an Ar gas containing 0.5% oxygen was 4.0 Pa such that the volume ratio between CoCrPt and $SiO_2$ became 80:20. The substrate temperature was a room temperature and the film thickness was adjusted to 18 nm. Thereafter, C was deposited to a thickness of 5 nm as an overcoat film.

As a result of observing a cross section of the magnetic film of the first medium obtained by film deposition in accordance with the method by using a transmission electron microscope, it was proved that the first medium was a perpendicular medium wherein magnetic crystal grains having a granular structure in which the magnetic crystal grains each having a generally columnar structure and grain boundaries between the crystal grains were filled with a non-magnetic layer were deposited perpendicularly as a film over an underlayer composed of a non-magnetic material consisting of crystal grains each having a generally columnar structure, as shown in FIG. 1. As a result of observing a cross section of the magnetic film of each of the second and third media by using the transmission electron microscope, it was proved that each of the second and third media was a perpendicular medium wherein magnetic crystal grains having a granular structure in which the magnetic crystal grains each having a generally columnar structure and grain boundaries between the crystal grains were filled with a non-magnetic layer were deposited perpendicularly as a film over an underlayer composed of a non-magnetic material consisting of crystal grains each having a generally columnar structure and used to control the crystal orientation of the magnetic recording layer formed thereover, as shown in FIG. 2.

Figure 4:
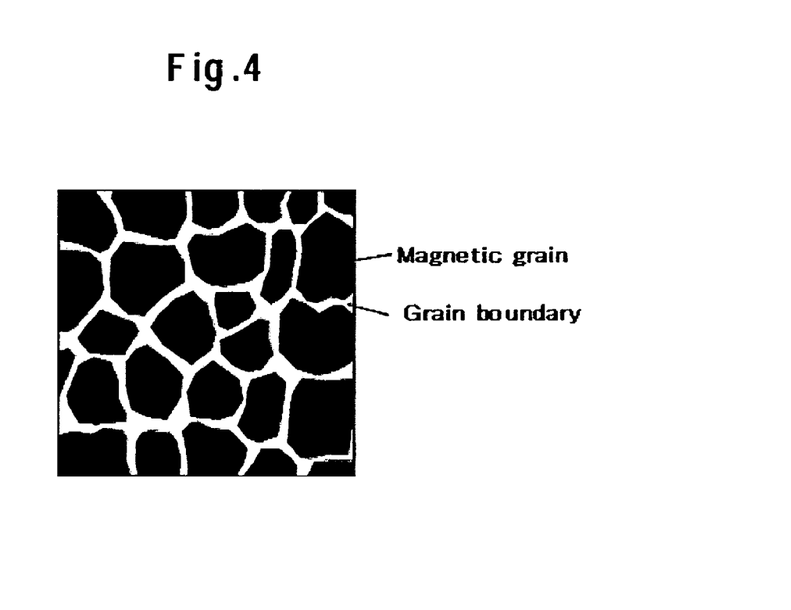
FIG. 4 is a view showing a crystal grain image obtained by viewing a magnetic recording medium of an embodiment of the present invention from a plane-view direction of a disk.
Figure 5:
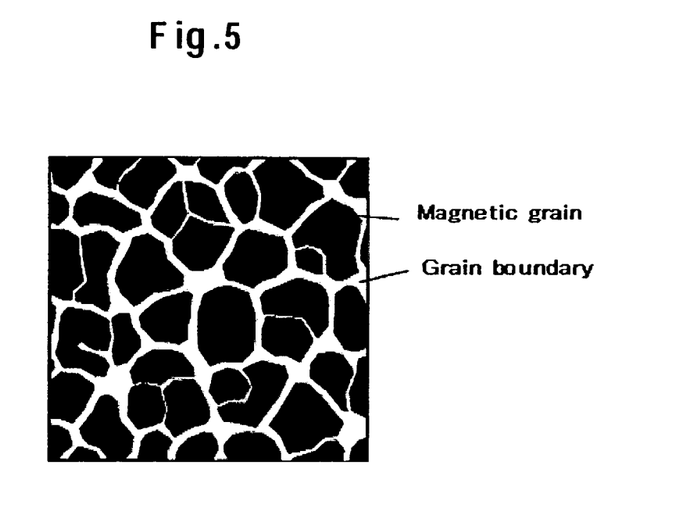
FIG. 5 is a view showing a crystal grain image obtained by viewing a conventional magnetic recording medium from a plane-view direction of a disk.

As a result of measuring the respective average grain sizes of the granular film (magnetic recording layer) composed of CoCrPt and $SiO_2$ and the Ru film (underlayer) in each of the first, second, and third magnetic recording media by using the transmission electron microscope, the average grain size of the magnetic recording layer of the first magnetic recording medium was 8.5 nm and the average grain size of the underlayer thereof was 9.6 nm. That is, the ratio between the grain size of the underlayer crystal grain and the grain size of the magnetic crystal grain was 0.89. At this time, the average grain boundary width obtained as a result of measuring the grain boundary widths was 1.1 nm and the standardized distribution thereof was 0.38, while a crystal grain image with a relatively uniform grain boundary width as shown in FIG. 4 was obtained. The same measurement was performed with respect to the second magnetic recording medium and the average grain size of the magnetic recording layer was 7.3 nm, while the average grain size of the underlayer was 9.6 nm. That is, the ratio between the grain size of the underlayer crystal grain and the grain size of the magnetic crystal grain was 0.76. At this time, the average grain boundary width obtained as a result of measuring the grain boundary widths was 1.1 nm and the standardized distribution thereof was 0.49, while a crystal grain image in which the grain boundary widths have a wide distribution as shown in FIG. 5 was obtained. The same measurement was performed with respect to the third magnetic recording medium and the average grain size of the magnetic recording layer was 6.6 nm, while the average grain size of the underlayer was 9.6 nm. That is, the ratio between the grain size of the underlayer crystal grain relative and the grain size of the magnetic crystal grain was 0.69. At this time, the average grain boundary width obtained as a result of measuring the grain boundary widths was 1.1 nm and the standardized distribution thereof was 0.58, while a crystal grain image in which the grain boundary widths have a distribution wider than in FIG. 5 was obtained. Although the average grain boundary widths of the first, second, and third magnetic recording medium were equally 1.1 nm, the standardized distributions thereof were greatly varied. In the third magnetic recording medium, in particular, the enlarged standardized grain boundary distribution due to the formation of wider grain boundaries and narrower grain boundaries all over the third magnetic recording medium was recognized from the crystal grain image.

Figure 6:
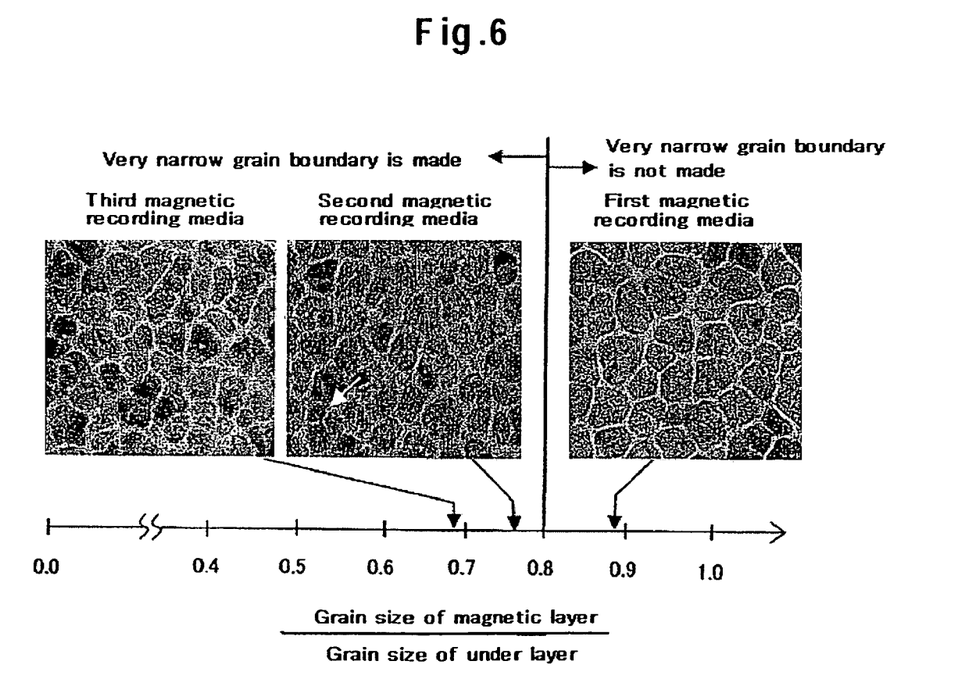
FIG. 6 is a transmission electron microscopic image corresponding to a magnetic crystal grain size/underlayer crystal grain size value which is obtained by viewing a magnetic recording medium from a plane of a disk.

In FIG. 6, the respective TEM plane-view images of the recording layer portions of the medium produced according to Experimental Example 1 are shown. In the drawing, the arrows indicate examples of the portions with the narrow grain boundaries. The abscissa represents values obtained by dividing the magnetic crystal grain sizes measured from the TEM images of the first, second, and third magnetic recording medium by the underlayer grain sizes and the obtained values were associated with the obtained TEM images. Although narrow grain boundaries as the portions indicated by the arrows were observed in the TEM plane-view images obtained as a result of observing the second and third magnetic recording media by using the transmission electron microscope, such a narrow grain boundary was not observed in the first magnetic recording medium and it was proved that an image with relatively uniform grain boundary widths was obtainable.

A lubricant layer was coated on each of these media and recording and reproduction were performed by using a magnetic head comprising a single pole head with a recording track width of 200 nm and a tunnel magneto-resistive element with a reproduction track width of 140 nm. A comparison was made between medium signal-to-noise ratios estimated from the grain sizes and measured medium signal-to-noise ratios at a linear recording density of 600 kFCI. In the first medium, the lowering of the measured medium signal-to-noise ratio from the medium signal-to-noise ratio estimated from the grain size was not observed. By contrast, a reduction of about 1.0 dB from the estimated signal-to-noise ratio was observed in the second magnetic recording medium and a reduction of about 1.6 dB from the estimated signal-to-noise ratio was observed in the third magnetic recording medium. The postulated reason for this is that medium noise increased due to the intense inter-grain interaction in the portions formed with narrow grain boundaries and caused a reduction in medium signal-to-noise ratio. That is, it was elucidated that a reduction in medium signal-to-noise ratio was prominent when a narrow grain boundary was formed and the standardized distribution thereof became 0.4 or more or 0.5 or more even though the average grain boundary widths are equal. It was also elucidated that, when the grain size of the magnetic crystal grain becomes smaller than 0.8 of the grain size of the underlayer crystal grain, the standardized distribution of the grain boundary widths is increased and a reduction in medium signal-to-noise ratio becomes marked.

Figure 7:
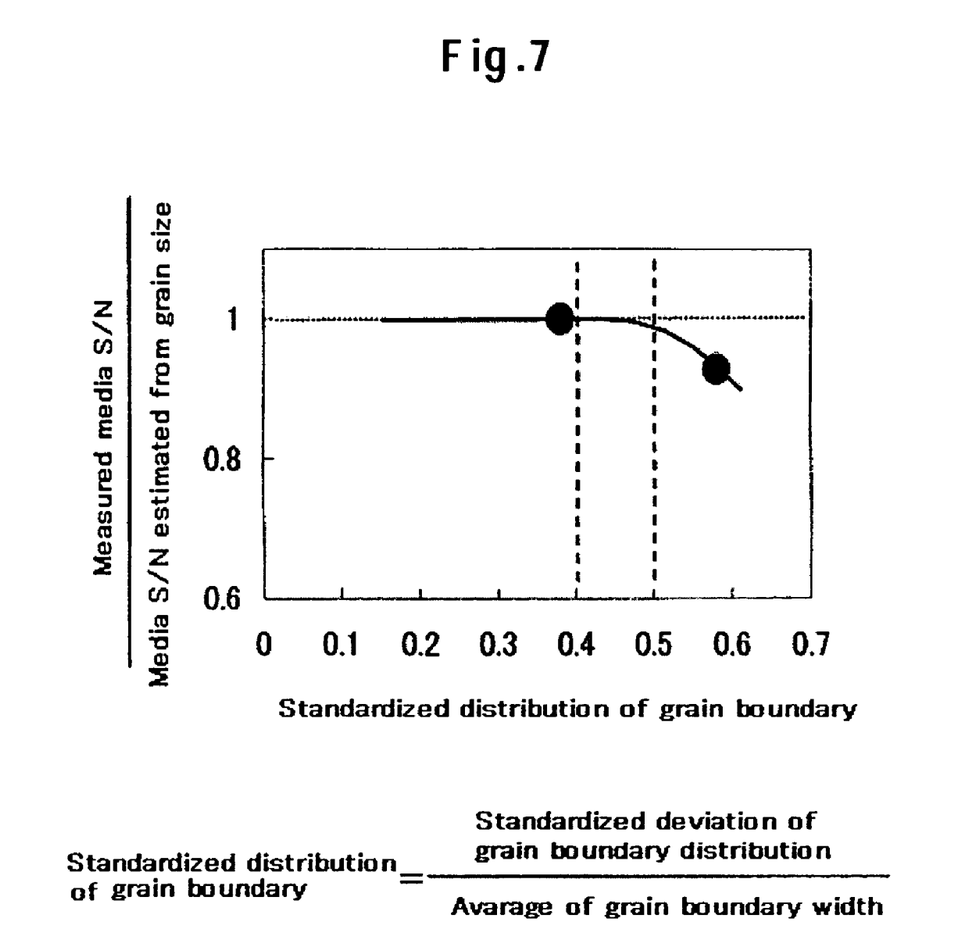
FIG. 7 is a graph showing a relationship between a value obtained by dividing a measured medium signal-to-noise ratio by a medium signal-to-noise ratio estimated from a grain size and a standardized grain boundary distribution.

FIG. 7 shows a relationship between the values of standardized grain-boundary distribution and values obtained by dividing measured medium signal-to-noise ratios by medium signal-to-noise ratios estimated from the grain sizes in the perpendicular magnetic recording medium produced according to Experimental Example 1.

EXPERIMENTAL EXAMPLE 2

In a magnetic recording medium according to Experimental Example 2, NiTa37.5 was deposited on a crystallized glass substrate through alkaline cleaning at a room temperature and a soft magnetic underlayer was formed by repeating the stacking of a FeTa10C12 layer with a thickness of 100 nm and a Ta layer with a thickness of 1.0 nm in three cycles. Thereafter, the surface of the soft magnetic underlayer was heated to 350° C. by using an infrared lamp and then cooled to a room temperature. Then, an underlayer, a magnetic recording layer, and an overcoat layer were formed. As the underlayer, Ru was formed to a film thickness of 10 nm. The magnetic recording layer was formed to have a film thickness of 15 nm such that the volume ratio between CoCr19Pt14 and $SiO_2$ became 75:25. The pressure of an Ar sputter gas when the magnetic recording layer was formed was adjusted to 4.0 Pa and an amount of oxygen contained in the sputter gas was adjusted to 0.5%. As the overcoat layer, C was deposited to a thickness of 5 nm.

As a result of observing a cross section of the deposited magnetic film of the medium by using a transmission electron microscope in accordance with the method, it was proved that the medium was a perpendicular medium wherein magnetic crystal grains having a granular structure in which the magnetic crystal grains each having a generally columnar structure and grain boundaries between the crystal grains were filled with a non-magnetic layer were deposited perpendicularly as a film over an underlayer composed of a non-magnetic material consisting of crystal grains each having a generally columnar structure and used to control the crystal orientation of the magnetic recording layer formed thereover, as shown in FIG. 1.

As a result of measuring the respective grain sizes of the underlayer and the magnetic recording layer and the grain boundary width by using the transmission electron microscope, the grain size of the underlayer was 8.6 nm, the grain size of the magnetic recording layer was 7.2 µm, the grain boundary width was 1.4 nm, and the standardized grain boundary distribution was 0.36. That is, the ratio between the magnetic crystal grain size and the underlayer crystal grain size was 0.84 and the standardized grain boundary distribution was 0.4 or less. The coercivity of the present medium was measured to be 450 kA/m by using a vibrating sample magnetometer and a squareness ratio was 1.0. Further, a lubricant layer was formed and recording and reproduction were performed by using a single pole head with a write track width of 100 nm and a tunnel magneto-resistive element with a read track width of 80 nm under a read/write condition of 200 gigabits per inch. As a result, a bit error rate was 10-5 or less and it was found that the magnetic recording layer had sufficient performance to perform high-density recording.

Specifically, by adjusting the grain size of the magnetic recording layer to be more than about 0.8 times and less than about 1 times the grain size of the underlayer and adjusting the standardized grain boundary distribution to about 0.4 or less, a magnetic recording medium with a high medium S/N ratio was obtainable. The constituent elements of each of the layers used in the present experimental example and the composition ratio thereamong may be changed, e.g., to adjust the magnitude of the saturation magnetization of a CoCrPt alloy and the coercivity thereof. In this case also, the relationship between the magnetic crystal grain size and the underlayer crystal grain size and the relationship of the distribution of the grain boundaries by an average grain boundary width are similarly established. Even if the type of the substrate, the type and structure of the soft magnetic underlayer, and the like are changed, the extremely fine structures of the magnetic recording layer and the underlayer are barely affected thereby and the relationship between the magnetic crystal grain size and the underlayer crystal grain size and the relationship of the distribution of the grain boundaries by an average grain boundary width are not in the least affected thereby.

It is to be understood that the above description is intended to be illustrative and not restrictive. Many embodiments will be apparent to those of skill in the art upon reviewing the above description. The scope of the invention should, therefore, be determined not with reference to the above description, but instead should be determined with reference to the appended claims along with their full scope of equivalents.

What is claimed is:

1. A magnetic recording medium comprising:
   a substrate;
   a soft magnetic underlayer formed on said substrate;
   an underlayer composed of crystal grains each formed on said soft magnetic underlayer and having a column structure; and
   a magnetic recording layer having a structure such that magnetic crystal grains each formed on said underlayer and having a column structure are separated from each other by grain boundaries,
   wherein a grain size Dm of each of the magnetic crystal grains of said magnetic recording layer and a grain size Du of each of the crystal grains of said underlayer satisfy a relationship represented by:

$0.8 \times Du \leq Dm < Du$;

wherein the width of said grain boundaries is less than 0.5 nm.

2. The magnetic recording medium according to claim 1, wherein each of the magnetic crystal grains of said magnetic recording layer has an easy axis of magnetization generally perpendicular to a surface of the substrate.

3. The magnetic recording medium according to claim 1, wherein the magnetic crystal grains composing said magnetic recording layer and the crystal grains composing said underlayer, each having a hexagonal closed packed structure, are in contact with each other.

4. The magnetic recording medium according to claim 1, wherein each of the magnetic crystal grains composing said magnetic recording layer is made of a CoCrPt alloy or an alloy containing CoCrPt as a main component and each of the crystal grains composing said underlayer is made of Ru or an alloy containing Ru as a main component.

5. The magnetic recording medium according to claim 1, wherein each of the magnetic crystal grains of said magnetic recording layer is formed on one of the crystal grains of said underlayer.

6. The magnetic recording medium according to claim 1, wherein the magnetic recording layer comprises Si oxide having a volume ratio of not less than about 10% and not more than about 30%.

7. The magnetic recording medium according to claim 1, wherein the magnetic recording layer has a coercivity in a direction perpendicular to the substrate of about 300 kA/m or more.

8. The magnetic recording medium according to claim 1, wherein the magnetic recording layer has a thickness of about 5 nm to about 30 nm.

9. The magnetic recording medium according to claim 1, further comprising an overcoat layer disposed on the magnetic recording layer.

10. The magnetic recording medium according to claim 9, wherein the overcast layer comprises C as a main component.

11. The magnetic recording medium according to claim 9, wherein the overcoat layer has a thickness of about 1 nm to about 5 nm.

12. The magnetic recording medium according to claim 9, further comprising a lubricant layer disposed on the overcoat layer.

13. The magnetic recording medium according to claim 1, wherein the grain size Dm has an average size of not less than about 5 nm.

14. The magnetic recording medium according to claim 1, wherein the grain size Dm has an average size of not more than about 12 nm.

* * * * *